Figure 1:
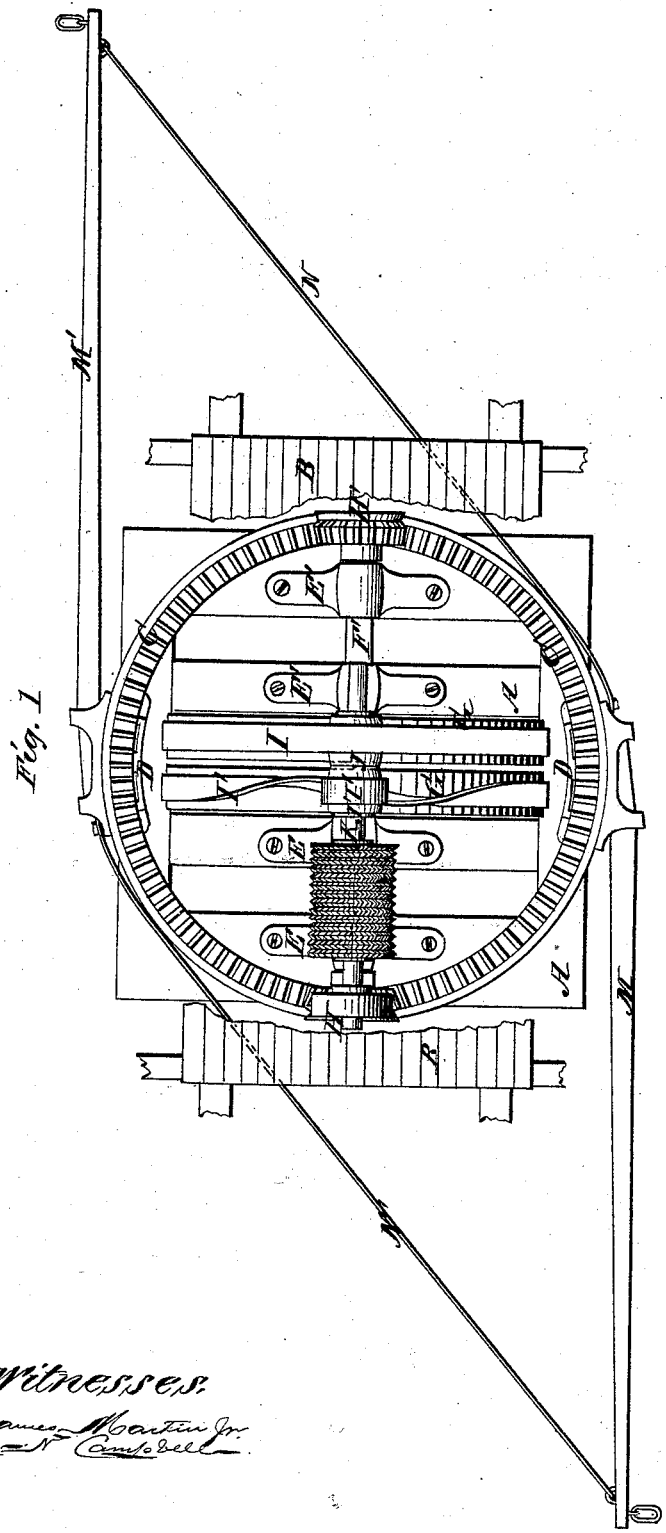

L. R. FAUGHT.
Horse-Powers.

No. 151,213.

2 Sheets--Sheet 1.

Patented May 26, 1874.

Witnesses:

Inventor:

2 Sheets--Sheet 2.
L. R. FAUGHT.
Horse-Powers.
No. 151,213. Patented May 26, 1874.
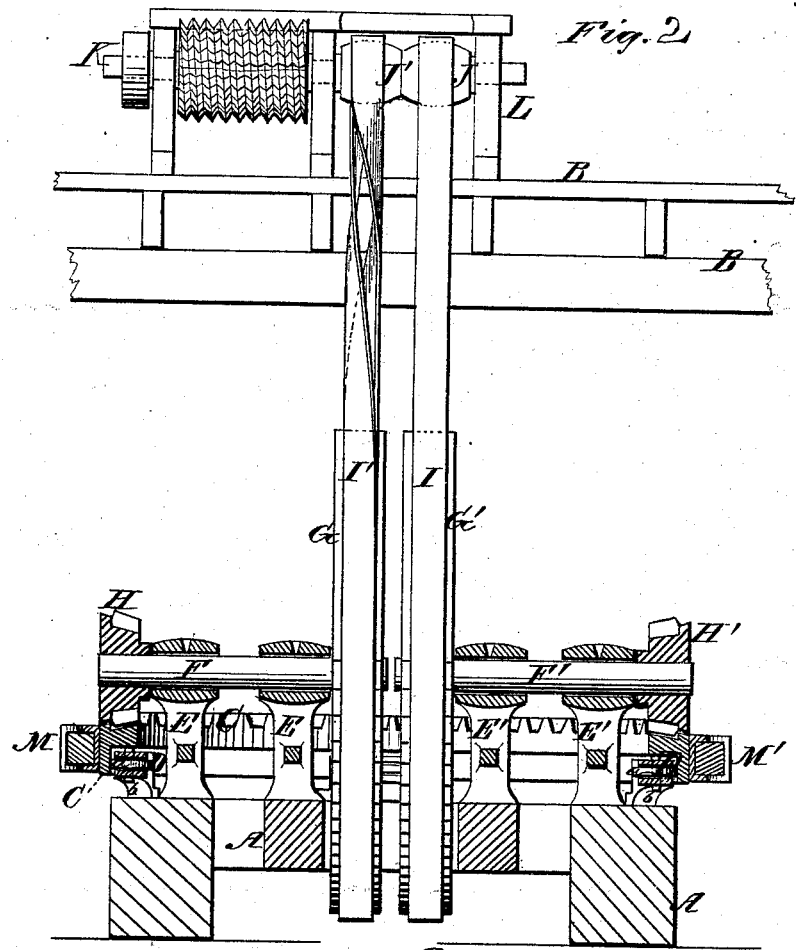
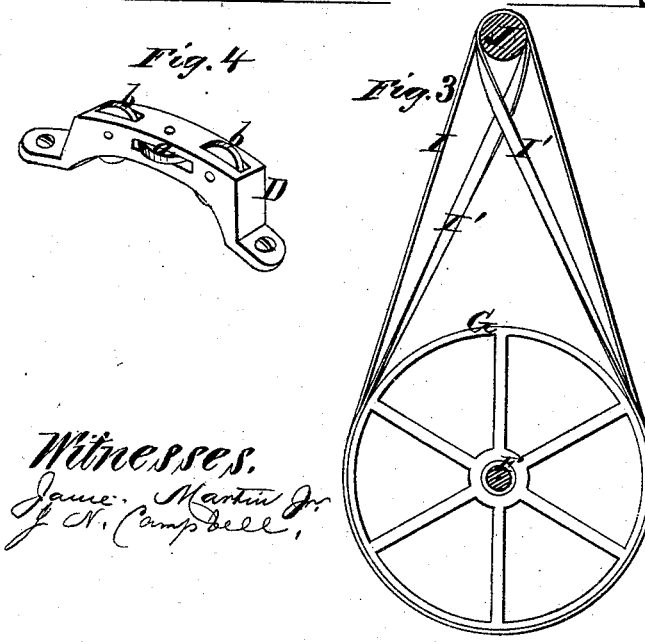
Witnesses. Inventor.

UNITED STATES PATENT OFFICE.

LUTHER R. FAUGHT, OF PHILADELPHIA, PENNSYLVANIA.

IMPROVEMENT IN HORSE-POWERS.

Specification forming part of Letters Patent No. 151,213, dated May 26, 1874; application filed May 6, 1874.

*To all whom it may concern:*

Be it known that I, LUTHER R. FAUGHT, of the city and county of Philadelphia and State of Pennsylvania, have invented a new and useful Improvement in Horse-Powers; and I do hereby declare that the following is a full, clear, and exact description thereof, reference being had to the accompanying drawings making part of this specification, in which—

Figure 1 is a plan view of a horse-power constructed according to my invention, and of a portion of a machine which is driven by it, said machine being shown on a floor which is above the floor or platform of the horse-power. Fig. 2 is a vertical section of the horse-power and machine shown in Fig. 1. Fig. 3 is a detail view of one of the pulleys and the two belts. Fig. 4 is a detached perspective view of one of the stationary standards with rolling supports for the rack to run upon.

The nature of my invention consists, first, in the combination of a revolving rack, two independent shafts, and two belts, one of which is crossed and the other straight, and a driving or driven shaft of a machine, whereby the power from the single rack is applied by independent belts on opposite sides of the center of the rack to the one driven or driving shaft of a machine, and thus the resistance upon the rack, its supports, and pinions, made to operate with far less friction and binding strain. It consists, secondly, in the combination of an annular ring-rack, having its draft-levers attached to its outer edge, and horizontal and vertical trains of rollers having stationary stands or rests, whereby the rack has horizontal and vertical bearings against rolling-supports, while the stands of the rollers do not change their position upon the platform.

To enable others skilled in the art to make and use my invention, I will proceed to describe it.

In the drawings, A represents the lower floor or platform upon which the horse-power is firmly fastened; B, the upper floor, upon which the machine (a cotton-gin, for instance) is also firmly fastened. C is the ring-rack, made without a central hub. This rack is in radial section a right angle, and the top surface is toothed, and the inner vertical surface smooth, as shown. D D are roller-stands, bolted firmly to the platform A. Each stand has horizontal rollers $a$ and vertical rollers $b$ fitted upon it, in the manner shown. These rollers form bearings, horizontal and vertical, for the rack at points equidistant from one another around the center of motion of the rack. E E' are standards bolted firmly to the platform within the circle of the rack. F F' are separate or independent pulley-shafts, placed in boxes at the top of the standards. G G' are independent pulleys, fastened upon the inner ends of the shafts F F'. H H' are independent bevel-wheels, fastened firmly on the outer ends of the pulley-shafts, and gearing into the teeth of the rack C. I I' are independent belts fitted upon the pulleys and extended to the machine or shaft which is to be driven. The belt I is run off straight, and the belt I' is crossed. J J' are pulleys fastened on the shaft K of a machine such as is designated by the letter L, or any other kind of a machine. The rack, pinions, pulleys, and shafts below the upper floor are held firmly down to their position by means of the boxes of the standards E E', in the same manner as in my horse-power patented heretofore. M M' are the draft-levers, and N N' stay-rods of the same. These are attached to the circumference of the ring, as shown.

The operation is as follows: The rack being set in motion, it revolves upon and against the horizontal and vertical trains of rollers, and thus but slight friction is experienced. The revolution of the rack causes the pulley-shafts with their pulleys to revolve in opposite directions, but as one of the belts is crossed the power is transmitted from the rack to the shaft K in the same direction by the two belts, and the motion of the machine to be driven is effected by power derived from opposite sides of the rack. This of course equalizes the resistance upon the rack and pinions, and greatly reduces the jarring and wearing strain upon the horse-power.

In practice I propose under some circumstances to arrange a pulley on each end of the shaft of the machine driven, and also to use a rack which runs upon a central shaft. Under such application of my invention the pulleys G G' would be applied on extensions of the shafts F F', which are outside of the rack. By this means both the rack and the machine driven would have the strain upon them balanced.

I do not claim horizontal and vertical bearing-rollers in combination with an annular rack under this patent, when the rollers are arranged in a traveling bearing or support, as such rollers and rack and support combined are shown in my patent of October 28, 1873; but

What I claim as my invention, and desire to secure by Letters Patent, is—

1. The combination of a revolving rack, two independent pulley-shafts, two belts, one of which is crossed and the other straight, and a driving or driven shaft of a machine, substantially as and for the purpose set forth.

2. The combination of the annular ring-rack, having its draft-levers attached by its outer edge, and horizontal and vertical trains of rollers having stationary stands or rests, substantially as and for the purpose set forth.

LUTHER R. FAUGHT.

Witnesses:
ROBT. S. REDFIELD,
ALEXANDER JOHNSTON.